United States Patent
Thangarasa et al.

(10) Patent No.: US 10,051,517 B2
(45) Date of Patent: Aug. 14, 2018

(54) D2D TRAFFIC BALANCING

(71) Applicant: Telefonaktiebolaget L M Ericsson (publ), Stockholm (SE)

(72) Inventors: Santhan Thangarasa, Vallingby (SE); Muhammad Kazmi, Bromma (SE); Stefano Sorrentino, Solna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 336 days.

(21) Appl. No.: 14/427,943

(22) PCT Filed: Feb. 5, 2015

(86) PCT No.: PCT/EP2015/052418
§ 371 (c)(1),
(2) Date: Mar. 12, 2015

(87) PCT Pub. No.: WO2016/124243
PCT Pub. Date: Aug. 11, 2016

(65) Prior Publication Data
US 2016/0234718 A1    Aug. 11, 2016

(51) Int. Cl.
*H04W 28/08* (2009.01)
*H04W 76/14* (2018.01)
*H04W 8/00* (2009.01)
*H04W 28/02* (2009.01)
(Continued)

(52) U.S. Cl.
CPC .......... *H04W 28/08* (2013.01); *H04W 8/005* (2013.01); *H04W 28/0205* (2013.01);
(Continued)

(58) Field of Classification Search
CPC .... H04W 76/023; H04W 88/04; H04W 8/005
See application file for complete search history.

(56) References Cited

U.S. PATENT DOCUMENTS

2012/0201158 A1    8/2012    Geirhofer et al.
2013/0003548 A1*   1/2013    Sridhar ................. H04L 47/125
                                                       370/235
(Continued)

FOREIGN PATENT DOCUMENTS

WO      20130068788 A1    5/2013

OTHER PUBLICATIONS

Author Unknown, Change Request: 33.213—Introduction of D2D ProSe, Nov. 21, 2014, pp. 1-236.*

(Continued)

*Primary Examiner* — Christopher Crutchfield
(74) *Attorney, Agent, or Firm* — Leffler Intellectual Property Law, PLLC (57) ABSTRACT

There is provided a method for balancing device-to-device (D2D) traffic in a communications network. The method is performed by a network device in the communications network. The method comprises acquiring information indicating that a first set of D2D capable wireless devices is present in the communications network. The method comprises acquiring D2D traffic information of the first set of D2D capable wireless devices. The method comprises adapting D2D traffic within the communications network, between a first cell on a first carrier and a second cell on a second carrier in the communications network, based on the D2D traffic information, thereby balancing D2D traffic in the communications network. There is also provided a network device configured to perform such a method and a computer program causing a network device perform such a method.

28 Claims, 5 Drawing Sheets

(51) Int. Cl.
  *H04W 88/04* (2009.01)
  *H04W 76/15* (2018.01)
  *H04W 76/02* (2009.01)
  *H04W 40/24* (2009.01)

(52) U.S. Cl.
  CPC ....... *H04W 40/246* (2013.01); *H04W 76/023* (2013.01); *H04W 76/025* (2013.01); *H04W 76/14* (2018.02); *H04W 76/15* (2018.02); *H04W 88/04* (2013.01); *H04W 28/0215* (2013.01)

(56) References Cited

U.S. PATENT DOCUMENTS

| | | | |
|---|---|---|---|
| 2013/0150051 A1* | 6/2013 | Van Phan | H04W 12/04 455/437 |
| 2014/0098670 A1 | 4/2014 | Choi et al. | |
| 2014/0247802 A1* | 9/2014 | Wijting | H04W 76/023 370/329 |
| 2015/0334555 A1* | 11/2015 | Seo | H04W 84/18 370/254 |
| 2015/0351089 A1* | 12/2015 | Li | H04W 72/082 455/426.1 |
| 2015/0373730 A1* | 12/2015 | Fujishiro | H04L 1/0003 455/450 |
| 2016/0374139 A1* | 12/2016 | Chen | H04W 76/043 |

OTHER PUBLICATIONS

PCT International Search Report, dated Oct. 1, 2015, in connection with International Application No. PCT/EP2015/052418, all pages.
PCT Written Opinion, dated Oct. 1, 2015, in connection with International Application No. PCT/EP2015/052418, all pages.

* cited by examiner

D2D TRAFFIC BALANCING

TECHNICAL FIELD

Embodiments presented herein relate to device-to-device (D2D) traffic, and particularly to a method, a network device, a computer program, and a computer program product for balancing device-to-device, D2D, traffic in a communications network.

BACKGROUND

In communications networks, there may be a challenge to obtain good performance and capacity for a given communications protocol, its parameters and the physical environment in which the communications network is deployed.

For example, Device-to-Device (D2D) communication has recently been introduced as a radio technology that enables (wireless) devices to communicate directly with each other, that is without routing the data paths through a network infrastructure. Potential application scenarios include, among others, proximity-based services where devices detect their proximity and subsequently trigger different services (such as social applications triggered by user proximity, advertisements, local exchange of information, smart communication between vehicles, etc.). Other applications include public safety support, where devices provide at least local connectivity even in case of damage to the radio infrastructure. A wireless device capable of D2D operation (such as D2D discovery and D2D communications) will hereinafter be denoted a D2D capable wireless device. In general terms, D2D operation is introduced as a generic term which may comprise transmission and/or reception of any type of D2D signals (e.g. physical signals, physical channel etc.) by a D2D communication capable wireless device and/or by D2D discover capable wireless device. D2D operation therefore includes D2D transmission, D2D reception, D2D communication, etc.

D2D capable wireless devices may only transmit D2D signals, or channels, in the uplink part of the spectrum (i.e., the part of the frequency interval dedicated for transmission from wireless devices to network nodes). Further, D2D operation by a D2D capable wireless device may only be in a half-duplex mode (i.e. the D2D capable wireless device may, for a given time/frequency resource, either only transmit D2D signals/channels or only receive D2D signals/channels, but not in the same time/frequency resource transmit and receive D2D signals/channels). Some D2D capable wireless devices may act as relays and hence relay signals to other D2D capable wireless devices.

Some control information for D2D communications is transmitted by D2D capable wireless devices and other control information for D2D communications is transmitted by network nodes. For example, D2D resource grants for D2D communication is transmitted via cellular downlink control channels. The D2D transmissions may occur on resources which are configured by the network or selected autonomously by the D2D capable wireless devices.

In general terms, D2D communication implies transmitting, by a transmitter of a D2D capable wireless device, D2D data and D2D communication control information with scheduling assignments (SAs) to assist a receiver of a D2D capable wireless device of the D2D data. D2D data transmissions take place according to configured patterns and in principle may be transmitted rather frequently. SAs are transmitted periodically. D2D transmitters that are within the network coverage may request network node resources for their D2D communication transmissions and receive in response D2D resource grants for SA and D2D data. Furthermore, a network node may broadcast D2D resource pools for D2D communication.

In general terms, D2D discovery messages are transmitted in infrequent periodic subframes. Network nodes may broadcast D2D resource pools for D2D discovery, both for reception and transmission.

D2D communication may support two different modes of D2D operation, called mode 1 and mode 2, respectively.

In mode 1, the location of the resources for transmission of the scheduling assignment by the broadcasting D2D capable wireless device comes from the network node. The location of the resource(s) for transmission of the D2D data by the broadcasting D2D capable wireless device comes from the network node.

In mode 2 a resource pool for scheduling assignment is pre-configured and/or semi-statically allocated. The D2D capable wireless devices on its own selects the resource for scheduling assignment from the resource pool for scheduling assignment to transmit its scheduling assignment.

Primary cell (PCell) interruption of one subframe occurs when a D2D capable wireless device switches its reception from D2D-to-WAN operation or from WAN-to-D2D operation (where WAN is short for wide area network and generally refers to any type of cellular communication network). This is because the receiver chain in the D2D capable wireless device needs to be retuned every time the operation is switched from WAN reception to D2D reception and from D2D reception to WAN reception. This applies to both D2D discovery and D2D communication capable wireless devices. Uplink resources between cellular (i.e., WAN) uplink and D2D operation should be partitioned to avoid, or minimize, the risk of the switching taking place in certain subframes, particularly subframe 0 and/or subframe 5, of the PCell. These subframes contain essential information such as primary and secondary reference signals (PSS/SSS) that are necessary for the wireless devices to perform cell search, and carrying out cell measurements. These subframes also contain master information block (MIB) and system information block (SIB1) information which is necessary for system information (SI) reading procedures. In addition to interruption that takes places due to such switching, there may be additional interruption of one subframe due to Radio Resource Control (RRC) reconfiguration procedure. While the switching interruption takes place for single receiving wireless device (e.g. a D2D discovery capable wireless device), the RRC reconfiguration interruption takes place for all types of D2D wireless devices (e.g. D2D Discovery capable and D2D Communication capable wireless devices).

A D2D capable wireless device is also interchangeably called a proximity-service (ProSe) capable wireless devices. Thus, a D2D discovery capable wireless device is also referred to as a wireless device capable of ProSe direct discovery and a D2D direct communication capable wireless device is also referred to as a wireless devices capable of ProSe direct communication. The link and/or carrier that is used for the ProSe direct communication and ProSe direct discovery between wireless devices is referred to as a sidelink. The carrier used for the sidelink may be called a ProSe carrier or a D2D carrier. The sidelink can be on the same carrier (e.g. UL carrier in frequency division duplex (FDD)) as used for WAN operation (i.e., a cellular communication carrier) or it can be on a carrier (i.e., a ProSe dedicated carrier) which is not used for WAN operation.

A D2D capable wireless device can be configured for D2D operation on a PCell and/or on one or more secondary cells (SCells). The PCell and the SCells are primarily used for cellular operations, e.g. reception and/or transmission of cellular signals (i.e., WAN operation). Several D2D capable wireless devices may have the same PCell. If the D2D capable wireless devices are mainly configured on a PCell then significant amount of the resources (e.g. subframes) on the sidelink which shares the same carrier as of the PCell will be used, or at least reserved, for D2D operation. This may degrade the performance of the WAN operation, especially if the PCell carries control information associated with carrier aggregation (CA) operation. To maintain acceptable WAN performance the network node may assign limited amount of D2D resources on the sidelink which operates on the same carrier as of the serving cell of the D2D capable wireless device, e.g. the PCell. However insufficient resources allocated for D2D on the sidelink may degrade D2D performance, e.g. due to infrequent transmissions of vital signals/channels such as D2D synchronization, scheduling assignment, etc.

On the other hand, if the D2D operation is arbitrarily distributed on sidelinks on carriers of the PCell and SCells for different D2D capable wireless devices then some D2D capable wireless devices may not be able to communicate with each other. For example, a D2D capable wireless device on a sidelink with a first carrier (say, f1) may not be able to receive D2D signal transmitted using D2D operation from a sidelink on a second carrier (say, f2).

Hence, there is still a need for an improved balancing of D2D traffic in a communications network.

SUMMARY

An object of embodiments herein is to provide efficient balancing of D2D traffic in a communications network.

According to a first aspect there is presented a method for balancing device-to-device (D2D) traffic in a communications network. The method is performed by a network device in the communications network. The method comprises acquiring information indicating that a first set of D2D capable wireless devices is present in the communications network. The method comprises acquiring D2D traffic information of the first set of D2D capable wireless devices. The method comprises adapting D2D traffic within the communications network, between a first cell on a first carrier and a second cell on a second carrier in the communications network, based on the D2D traffic information, thereby balancing D2D traffic in the communications network.

Advantageously this provides efficient balancing of D2D traffic in a communications network.

Advantageously this enables the D2D traffic to be efficiently distributed on different carriers and/or cells.

Advantageously this enables efficient use of radio resources by efficiently configuring and moving D2D capable wireless devices on different carriers depending on the D2D activity.

Advantageously this enables D2D capable wireless devices to be efficiently served, for example by configuring, de-configuring, swapping, activating, deactivating one or more PCells, SCells, primary SCells (PSCells), on demand depending on the D2D activity on current cells.

Advantageously this enables legacy wireless devices, i.e., wireless devices not capable of D2D (e.g. cellular or other type of wireless devices) to be served more efficiently and quickly by moving the D2D traffic on different carriers and/or cells depending on the D2D traffic activity. Hence, both the wireless device performance and network performance is improved.

According to a second aspect there is presented a network device for balancing D2D traffic in a communications network. The network device comprises a processing unit. The processing unit is configured to cause the network device to acquire information indicating that a first set of D2D capable wireless devices is present in the communications network. The processing unit is configured to cause the network device to acquire D2D traffic information of the first set of D2D capable wireless devices. The processing unit is configured to cause the network device to adapt D2D traffic within the communications network, between a first cell on a first carrier and a second cell on a second carrier in the communications network, based on the D2D traffic information, thereby balancing D2D traffic in the communications network.

The network device may be part of a network node or a wireless device.

According to a third aspect there is presented a computer program for balancing D2D traffic in a communications network, the computer program comprising computer program code which, when run on a processing unit of a processing unit of a network device, causes the network device to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
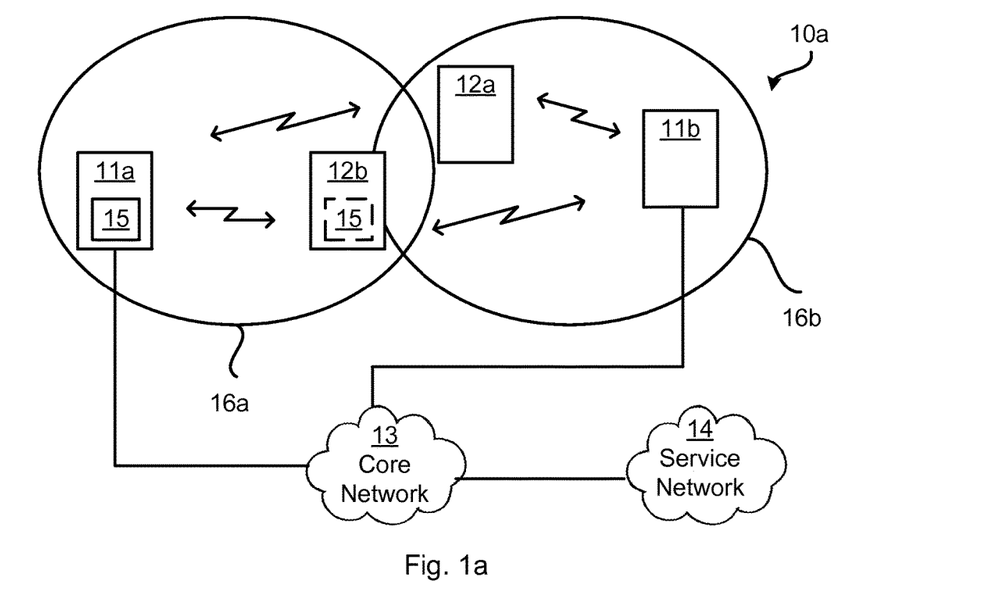
FIG. 1*a* is a schematic diagram illustrating a communication network according to an embodiment.

FIG. 1a is a schematic diagram illustrating a communications network 10a where embodiments presented herein can be applied. The communications network 10a comprises network nodes 11a, 11b. Each network node 11a, 11b provides network coverage for wireless devices 12a, 12b. In general terms, each wireless device 12a, 12b may represent a set of wireless devices. The network coverage is defined by cells 16a, 16b, or regions, in which the network nodes 11a, 11b is enabled to transmit signals to, and receive signals from, the wireless devices 12a, 12b. The network nodes 11a, 11b are operatively connected to a core network 13 which, in turn, is operatively connected to a service network 14. A wireless device 12a, 12b operatively connected to one of the network nodes 11a, 11b is thereby able to access content and services as provided by the service network 14.

One network node 11a and/or one wireless device 12b comprises a network device 15. The functionality of the network device 15 will be provided below.

Each network node 11a, 11b may be provided as a radio access network node such as a radio base station, a base transceiver station, a node B (NB), an evolved node B (eNB), a master eNB (MeNB), a secondary eNB (SeNB), a network node belonging to a master cell group (MCG) or a secondary cell group (SCG), a multi-standard radio (MSR) radio node, a network controller, a radio network controller (RNC), a base station controller (BSC), a relay, a donor node controlling relay, an access point (AP), a transmission point, a transmission node, a remote radio unit (RRU), a remote radio head (RRH), a node in a distributed antenna system (DAS), a core network node (e.g., mobile switching center (MSC), mobility management entity (MME), etc.), an operation and maintenance (OAM) node, an operational support system (OSS) node, a self-organizing network (SON) node, a positioning node (e.g., an Evolved Serving Mobile Location Center (E-SMLC) node), a minimization of driving test (MDT) node, etc. As the skilled person understands, the communications network 10a may comprise a plurality of network nodes 11a, 11b; the herein disclosed embodiments are not limited to a particular number of network nodes 11a, 11b. The wireless device 12 may be provided as a portable wireless device such as a mobile station, a mobile phone, a handset, a wireless local loop phone, a user equipment (UE), a smartphone, a device to device (D2D) wireless device, a machine type wireless device or wireless device capable of machine to machine (M2M) communication, a laptop computer, such as laptop embedded equipped (LEE), or laptop mounted equipment (LME), a tablet computer, a universal serial bus (USB) dongle, or a wireless sensor device. As the skilled person understands, a plurality of wireless devices 12 could be operatively connected to the network nodes 11a, 11b; the herein disclosed embodiments are not limited to a particular number of wireless devices.

Some embodiments are described for long-term evolution (LTE) type communications networks. However the embodiments are equally applicable to any radio access technology (RAT) or multi-RAT systems, where the wireless device 12a, 12b receives and/or transmit signals (e.g., data), such as frequency division duplex (FDD), time division duplex (TDD), Wideband Code Division Multiple Access (WCDMA), High Speed Packet Access (HSPA), Global System for Mobile Communications (GSM), GSM EDGE Radio Access Network (GERAN), Wi-Fi, Wireless Local Area Network (WLAN), Code Division Multiple Access 2000 (CDMA2000), etc.

In general terms, in so-called multicarrier (MC) or carrier aggregation (CA) operation the wireless device 12a, 12b is able to receive and/or transmit data to more than one serving cell 16a, 16b. The term CA is also called (e.g. interchangeably called) "multi-carrier system", "multi-cell operation", "multi-carrier operation", "multi-carrier" transmission and/or reception. This means that CA can be used for transmission of signaling and data in the uplink (UL) direction and/or downlink (DL) direction. The embodiments presented herein are applicable to single carrier as well as to multi-carrier, or to carrier aggregation.

A CA capable wireless device 12a, 12b can be configured to operate with more than one serving cell 16a, 16b. The carrier of each serving cell 16a, 16b is generally called as a component carrier (CC). In simple terms, the component carrier (CC) means an individual carrier in a multi-carrier system. One of the CCs is the primary component carrier (PCC), also called primary carrier, or anchor carrier. The remaining carriers are called secondary component carrier (SCC), also called secondary carriers, or supplementary carriers. The serving cell is interchangeably called primary cell (PCell) or primary serving cell (PSC). Similarly, the secondary serving cell is interchangeably called secondary cell (SCell) or secondary serving cell (SSC).

Generally, the primary or anchor CC carries the essential wireless device specific signaling. The primary CC (i.e., PCC or PCell) exists in both uplink and downlink directions in CA. In case there is a single UL CC the PCell is on that CC. The communications network 10a may assign different primary carriers to different wireless devices 12a, 12b operating in the same sector or cell.

A multi-carrier SCell setup herein refers to a procedure which enables the network node 11a, 11b to at least temporarily setup or release the use of an SCell, in DL and/or UL by a CA capable wireless device 12a, 12b. Herein the SCell setup or release procedure, or command, can perform at least one of: configuration of SCell(s), de-configuration of SCell(s), activation of SCell(s), deactivation of SCell(s).

Details of configuration and de-configuration of an SCell will now be summarized. The configuration procedure is used by the serving network node 11a, 11b to configure a CA capable wireless device 12a, 12b with at least one SCell (DL SCell, UL SCell, or both). The de-configuration procedure is used by the network node 11a, 11b to de-configure, or remove, at least one already configured SCell (DL SCell, UL SCell, or both). The configuration or de-configuration procedure can also be used to change the current multi-carrier configuration, e.g. for increasing or decreasing the number of SCells or for swapping the existing SCells with new ones. The configuration and de-configuration is in LTE performed by an eNode B.

Details of activation and deactivation of secondary cells will now be summarized. The serving network node 11a, 11b can activate at least one deactivated SCell or deactivate at least one SCells on the corresponding configured secondary carriers. Generally, the PCell is always activated. The configured SCells are initially deactivated upon addition and after a cell change, e.g. a handover. In LTE the activation and deactivation command is sent by the eNode B via a media access control (MAC) control element (MAC-CE). The deactivation of SCell saves battery power in the wireless devices 12a, 12b.

Details of SCell activation and deactivation delay requirements will now be summarized. The SCell activation and deactivation delay requirements are defined in TS 36.133 release 10. Upon receiving an SCell activation command in subframe n, the wireless device 12a, 12b shall be capable to transmit valid channel state information (CSI) report and apply actions related to the activation command for the SCell being activated no later than in subframe n+24, provided conditions as provided next are met for the SCell. During the period equal to max(5 measCycleSCells, 5 DRX cycles) before the reception of the SCell activation command, the wireless device 12a, 12b has sent a valid measurement report for the SCell being activated, and the SCell being activated remains detectable according to the cell identification conditions, and the SCell being activated also remains detectable during the SCell activation delay according to the cell identification conditions. Otherwise, upon receiving the SCell activation command in subframe n, the wireless device 12a, 12b shall be capable to transmit valid CSI report and apply actions related to the activation command for the SCell being activated no later than in subframe n+34 provided the SCell can be successfully detected on the first attempt.

Upon receiving an SCell deactivation command, or upon expiry of an sCellDeactivationTimer in subframe n, the wireless device 12a, 12b shall accomplish the deactivation actions for the SCell being deactivated no later than in subframe n+8.

Radio measurements done by the wireless device 12a, 12b are typically performed on the serving cell as well as on neighbor cells over some known reference symbols or pilot sequences. The measurements are done on cells on an intra-frequency carrier, inter-frequency carrier(s) as well as on inter-RAT (where RAT is short for radio access technology) carriers(s) (depending upon the wireless device capability whether it supports that RAT). To enable inter-frequency and inter-RAT measurements for the wireless device 12a, 12b requiring gaps, the communications network boa has to configure the measurement gaps.

The measurements are done for various purposes. Some example measurement purposes are: mobility, positioning, self-organizing network (SON), minimization of drive tests (MDT), operation and maintenance (OAM), network planning and optimization, etc. Examples of measurements in LTE are Cell identification, also called physical cell identity (PCI) acquisition, reference symbol received power (RSRP), reference symbol received quality (RSRQ), cell global identity (CGI) acquisition, reference signal time difference (RSTD), wireless device reception-transmission (RX-TX) time difference measurement, radio link monitoring (RLM), which consists of out of synchronization (out of sync) detection and in synchronization (in-sync) detection, etc. CSI measurements performed by the wireless device 12a, 12b are used for scheduling, link adaptation, etc. by the communications network boa. Examples of CSI measurements or CSI reports are channel quality indicator (CQI), Precoding Matrix Indicator (PMI), Rank Indicator (RI), etc. They may be performed on reference signals such as common reference signal (CRS), Channel State Information-Reference Signal (CSI-RS), or Demodulation reference signal (DMRS).

In order to support different functions such as mobility (e.g. cell selection, handover, etc.), positioning a wireless device 12a, 12b, link adaption, scheduling, load balancing, admission control, interference management, interference mitigation etc., the network node 11a, 11b also performs radio measurements on signals transmitted and/or received by the network node 11a, 11b. Examples of such measurements are SNR, SINR, received interference power (RIP), BLER, propagation delay between UE and itself, transmit carrier power, transmit power of specific signals (e.g. Tx power of reference signals), positioning measurements like TA, eNode B Rx-Tx time difference, etc.

At least some of the scenarios disclosed herein are based on at least one network node 11a serving a first cell 16a, say a PCell, and another cell that is configurable upon need basis, say a first SCell, denoted SCell-1. In some embodiment the SCell-1 may be served by a second network node 11b. The embodiments apply regardless of whether the PCell and one or more SCells are served by the same or different network nodes.

The network node 11a may also configure a third cell, say a second SCell, denoted SCell-2 on a different carrier on need basis. The embodiments presented in this disclosure apply for a wireless device 12a, 12b configured with CA with any number of SCells.

In some embodiments the wireless devices 12a, 12b may be configured with a PCell and a PSCell or with a PCell, a PSCell and at least one SCells such as in dual connectivity. In general terms, the configured cells are wireless devices specific and the embodiments included in this disclosure may be applied on wireless devices basis on each configured cell.

In general terms there are two types of wireless devices 12a, 12b served by the communications network 10a. The first type, denoted type-1 wireless device, being cellular capable wireless devices operating cellular traffic. These wireless devices are denoted wireless area network (WAN) capable wireless device or legacy wireless device. The second type, denoted type-2 wireless device, being D2D capable wireless devices, which, in addition to being cellular capable, are also capable of D2D operation. Furthermore the D2D capable wireless devices are also be CA capable with a minimum configuration, comprising a PCell and one SCell, such as SCell-1.

Type-2 wireless devices 12a, 12b can be configured to operate for only WAN traffic in case D2D operation is not required. The wireless devices 12a, 12b can be configured to operate on any serving cell e.g. PCell, SCell or PSCell. Some embodiments apply when at least two type-2 wireless devices 12a, 12b are served by the communications network boa. Furthermore such a type-2 wireless devices 12a, 12b can be configured with at least one SCell as also stated above; i.e., the wireless devices 12a, 12b are CA capable. The PCell, PSCell and SCell(s) are wireless device specific. However, a plurality of wireless devices 12a, 12b can be configured with the same cell as their PCell or SCell or PSCell. Therefore, typically, a group of wireless devices 12a, 12b may have the same PCell, which is different from the PCell of another group of wireless devices 12a, 12b. For example with only two type-2 wireless devices 12a, 12b, one wireless device 12a can be configured for D2D operation on a sidelink on the carrier of the PCell (e.g. f1), while the other wireless device 12b can be configured for D2D operation on a sidelink of the carrier of the SCell (e.g. f2).

The embodiments presented in this disclosure may further be applicable for type-2 wireless devices 12a, 12b configured with CA with at least a PCell and with any number of SCells. Typically, the D2D operation may be used on sidelink which uses UL radio resource of the SCell (i.e. on a UL carrier of SCell in FDD or in UL subframe(s) of the SCell in TDD). The embodiments may however also be valid if the type-2 wireless devices 12a, 12b are configured for D2D operation on sidelinks which use one or more DL resource (e.g., carriers, subframes etc.) of SCell(s) or even when configured for D2D operation on sidelinks which use a combination of resources of UL and DL SCells.

The embodiments disclosed herein particularly relate to balancing D2D traffic in a communications network. In order to obtain such balancing D2D traffic in a communications network there is provided a network device 15, a method performed by the network device 15, a computer program comprising code, for example in the form of a computer program product, that when run on a processing unit of the network device 15, causes the network device 15 to perform the method.

Figure 2A:
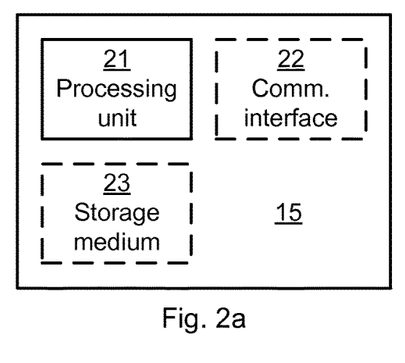
FIG. 2*a* is a schematic diagram showing functional units of a network device according to an embodiment.

FIG. 2a schematically illustrates, in terms of a number of functional units, the components of a network device 15 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The network device 15 may further comprise a communications interface 22 for communications with devices and/or nodes of a communications network. As such the communications interface 22 may comprise one or more transmitters and receivers, comprising analogue and digital components and a suitable number of antennas for wireless communications and, optionally, ports for wireline communications. The processing unit 21 controls the general operation of the network device 15 e.g. by sending data and control signals to the communications interface 22 and the storage medium 23, by receiving data and reports from the communications interface 22, and by retrieving data and instructions from the storage medium 23. Other components, as well as the related functionality, of the network device 15 are omitted in order not to obscure the concepts presented herein.

Figure 2B:
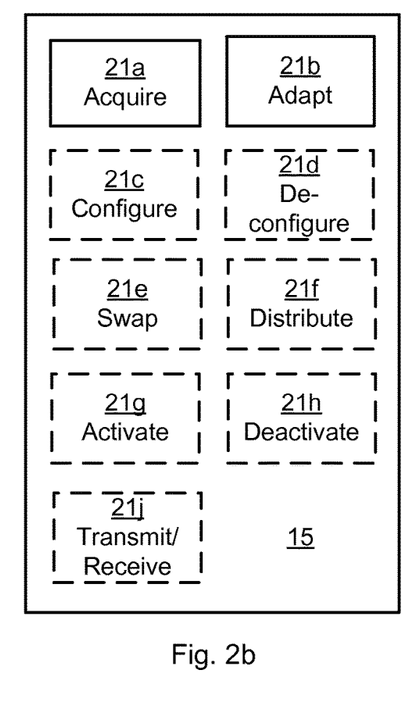
FIG. 2*b* is a schematic diagram showing functional modules of a network device according to an embodiment.

FIG. 2b schematically illustrates, in terms of a number of functional modules, the components of a network device 15 according to an embodiment. The network device 15 of FIG. 2b comprises a number of functional modules; an acquire module 21a configured to perform below steps S102, S104, S104a, S104b, and an adapt module 21b configured to perform below steps S108, S108j, S108k. The network device 15 of FIG. 2b may further comprises a number of optional functional modules, such as any of a configure module 21c configured to perform below steps S108a, S108b, a de-configure module 21d configured to perform below step S108c, a swap module 21e configured to perform below steps S108d, S108e, a distribute module 21f configured to perform below step S108f, an activate module 21g configured to perform below step S108g, a deactivate module 21h configured to perform below step S108h, and a transmit and/or receive module 21j configured to perform below steps S106a, S106b. The functionality of each functional module 21a-j will be further disclosed below in the context of which the functional modules 21a-j may be used. In general terms, each functional module 21a-j may be implemented in hardware or in software. Preferably, one or more or all functional modules 21a-j may be implemented by the processing unit 21, possibly in cooperation with functional units 22 and/or 23. The processing unit 21 may thus be arranged to from the storage medium 23 fetch instructions as provided by a functional module 21a-j and to execute these instructions, thereby performing any steps as will be disclosed hereinafter.

The network device 15 may be provided as a standalone device or as a part of a further device. For example, the network device 15 may be provided as part of a radio network node 11a and/or as part of a D2D capable wireless device 12b.

Figure 3:
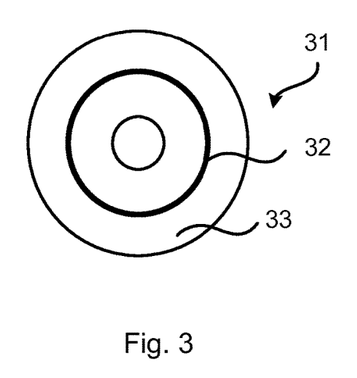
FIG. 3 shows one example of a computer program product comprising computer readable means according to an embodiment.

FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

Figure 4:
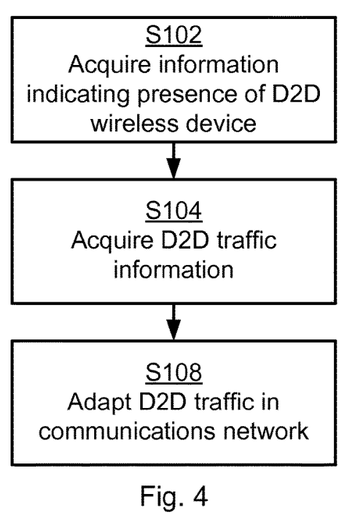
FIGS. 4 and 5 are flowcharts of methods according to embodiments.
Figure 5:
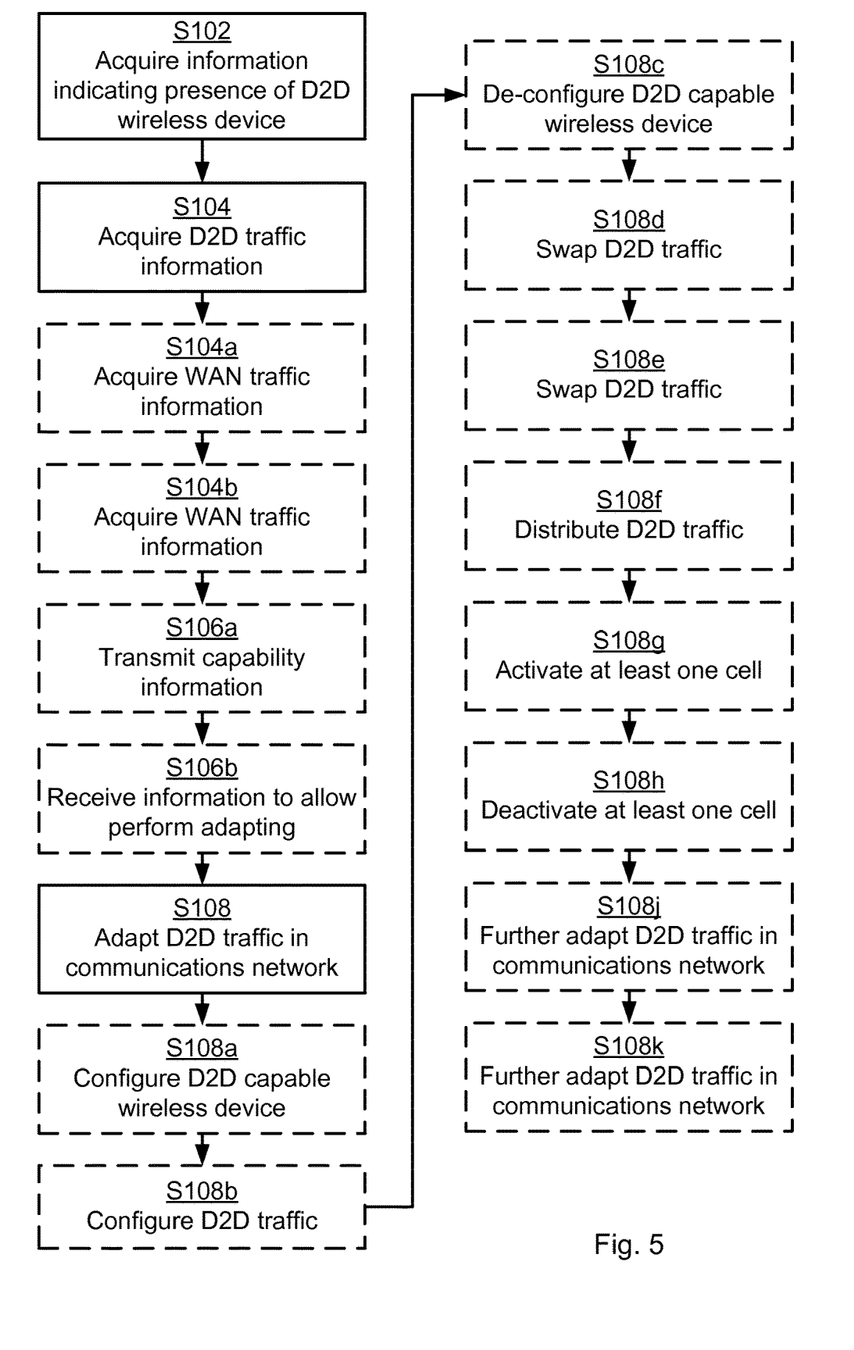

FIGS. 4 and 5 are flow chart illustrating embodiments of methods for balancing D2D traffic in a communications network 10a-10g. The methods are performed by the network device 15. The methods are advantageously provided as computer programs 32.

Reference is now made to FIG. 4 illustrating a method for balancing D2D traffic in a communications network 10a-10g as performed by a network device 15 according to an embodiment. Parallel references are made to the communications networks boa-log as schematically illustrated in FIGS. 1a-1g.

The balancing of the D2D traffic in the communications network 10a-10g is based on D2D traffic information. In order for any D2D traffic information to be acquired, there must be D2D capable wireless devices present in the communications network boa-log that could generate such D2D traffic information. Hence, the network device 12 is configured to, in a step S102, acquire information indicating that a first set of D2D capable wireless devices 12a is present in the communications network 10a-10g. By present is meant that wireless devices of the first set of D2D capable wireless devices are operatively connected to at least one network node 11a, 11b in the communications network 10a-10g. The term operatively connected implies that wireless devices of the first set of D2D capable wireless devices are either camping on a cell of at least one network node 11a, 11b in the communications network 10a-10g (i.e., in idle mode) or are engaged in a communications session with at least one network node 11a, 11b in the communications network 10a-10g (i.e., in active mode).

D2D traffic information may then be acquired. Particularly, the network device 12 is configured to, in a step S104, acquire D2D traffic information of the first set of D2D capable wireless devices 12a.

D2D traffic within the communications network 10a-10g may then be adapted. Particularly, the network device 12 is configured to, in a step S108, adapt D2D traffic within the communications network 10a-10g between a first cell 16a on a first carrier and a second cell 16b on a second carrier in the communications network 10a-10g, thus balancing D2D traffic in the communications network 10a-10g. The D2D traffic is adapted based on the D2D traffic information.

In this respect, a cell is assumed operate on a particular carrier. Thus, the first cell and the second cell operate on a first carrier and a second carrier, respectively.

In this respect, load balancing means balancing load on at least one cell, but load balancing generally is between two or more cells in the communications network 10a-10g, i.e., between carriers on which cells operate.

Embodiments relating to further details of balancing D2D traffic in a communications network 10a-10g will now be disclosed.

There may be different types of D2D capable wireless devices. For example, the D2D capable wireless devices may be proximity-service (ProSe) capable wireless devices.

There may be different types of D2D traffic. For example, the D2D traffic may be ProSe direct communication, or ProSe direct discovery, or any combination thereof.

There may be different ways to provide the first carrier and the second carrier. Different embodiments relating thereto will now be described in turn.

For example, the carriers may be for CA. Hence, according to an embodiment at least one of the first carrier and the second carrier is configured for CA.

For example, the carriers may be of a PCell for the wireless devices 12a, 12b. Hence, according to an embodiment at least one of the first cell and the second cell is a PCell of the first set of D2D capable wireless devices.

For example, the carriers may be of a SCell for the wireless devices 12a, 12b. Hence, according to an embodiment at least one of the first cell and the second cell is a SCell of the first set of D2D capable wireless devices.

There may be different examples of D2D traffic information, and different examples of how the D2D traffic information may be used to obtain load balancing of the D2D traffic. Different embodiments relating thereto will now be described in turn.

The load balancing procedure of D2D UEs across different cells is initiated as in step S108. A suitable load balancing scheme may be applied based on triggering conditions as explained next.

The D2D traffic information can be expressed in terms of one or more load metrics or criteria. According to an embodiment the D2D traffic information represent at least one of traffic load, traffic activity, and traffic pattern of the D2D traffic in at least one of the first cell and the second cell.

In general terms, the network device 15 may assess one or more criteria, or metrics, related to the D2D traffic information and based on the assessment the network device 15 initiate load balancing of D2D capable wireless devices on different cells operating on different carriers. That is, according to an embodiment, how to adapt the D2D traffic is based on an outcome of a comparison of the D2D traffic information to a threshold.

Examples of threshold parameters on which such a comparison can be based will be provided next. The threshold may be based on at least one of the following: number of wireless devices in the first set of D2D capable wireless devices, total number of other wireless devices in the cell, fraction of resources configured for D2D operation on sidelinks of each of the first carrier and the second carrier, mean or aggregated bit rate or throughput per wireless device 12a, 12b in the cell, total transmit power of wireless devices 12a, 12b on at least one of the first carrier and the second carrier, total number of used physical channels or resource blocks on at least one of the first carrier and the second carrier in a subframe or frame, and fraction of used physical channels or resource blocks on at least one of the first carrier and the second carrier in a subframe or frame.

The network device 15 may further identify information on D2D traffic pattern among the D2D wireless devices in the served cell and/or neighbor cells. The identifying may be performed by the network device 15 itself, but the network device 15 may acquire this information from e.g., a network node 11a, 11b, a node in the core network 14, etc. Additional or alternative threshold parameters on which the comparison can be based are therefore thresholds based on at least one of: location of wireless devices 12a, 12b in the cell, type of generated traffic by wireless devices 12a, 12b in the cell, and grouping of wireless devices 12a, 12b in at least one of the first cell and the second cell.

Some of the herein disclosed embodiments also consider WAN traffic information. The WAN traffic information may indicate at least one of: number of wireless devices in the first set of D2D capable wireless devices 12a, 12b, number of wireless devices in a set of wireless devices not capable of D2D operation (hereinafter denoted second set of wireless devices), mean or aggregated bit rate or throughput of the wireless devices in the second set, mean or aggregated bit rate or throughput of the wireless devices in the first set, amount of buffered data for the wireless devices in the first set, and amount of buffered data for the wireless devices in the second set.

As a first example the objective of load balancing between f1 and f2 is achieved provided that total number of D2D capable wireless devices on sidelinks of both the first carrier and the second carrier are the same, or is within a certain margin e.g., difference is not more than 5%.

As a second example the objective of load balancing between the first carrier and the second carrier is achieved provided that the total number, or percentage, of radio resources (e.g., resource blocks, subframes, etc.) used by the D2D capable wireless devices on sidelinks of both the first carrier and the second carrier is the same, or is within a certain margin e.g., difference is not more than 5%.

The use of different criteria for applying a suitable load balancing mechanism will be elaborated next.

If the acquired D2D traffic information, possibly in combination with acquired WAN traffic information, triggers a threshold, the network device 15 may adapt D2D traffic within the communications network 10a-10g as in step S108 for example according to at least one of the actions listed below to enhance the load balancing of the cells.

If the obtained information on D2D traffic activity and/or the total traffic activity (i.e., including the WAN traffic) indicates that the traffic activity is higher than a threshold th1, the network device 15 may configure a SCell or a PCell and move certain wireless devices 12a, 12b to the newly configured cell.

If the obtained information indicates that the D2D activity level and/or the total traffic activity is below the threshold th1, then the wireless devices 12a, 12b may be kept in the cells unchanged. If a wireless device 12a, 12b is already configured with an SCell (e.g. SCell-1) then the network device 15 may configure the same wireless device 12*a*, 12*b* with another SCell (e.g. SCell-2) for D2D operation to enable load balancing. In this example, for instance, the network device 15 may configure a sidelink for D2D operation on SCell-2. This will offload the D2D traffic on SCell-1. The network device 15 may perform this operation for plurality of wireless devices 12*a*, 12*b*. The network device 15 may thus distribute the D2D operation between the sidelinks on cells and/or on newly configurable cells based on the configured D2D scheduling patterns.

As an example, if the configured number of D2D subframes is greater than a threshold, say N, during a time interval, say T1, the network device 15 may determine to adapt the load balancing to distribute the D2D capable wireless devices 12*a*, 12*b* and/or D2D traffic among the cells. As disclosed above, adapting the load balancing may be achieved by e.g. the network device 15 configuring a SCell/PCell or PSCell on the same and/or different carrier frequencies and moving certain D2D wireless devices to those cells. If the configured number of D2D subframes is less than the threshold, the network device 15 may keep the distribution of wireless devices 12*a*, 12*b* unchanged.

Based on the abovementioned information, the network device 15 may determine that the D2D load on one or more carriers is higher than a threshold and/or that D2D load on two or more carriers is not balanced. For example, if on carrier ft the D2D traffic activity is higher than the D2D traffic activity on carrier f2, the network device 15 may apply at least one of the actions listed next to achieve load balancing.

The network device 15 may determine, based on D2D capability information, the maximum number of serving cells with which the wireless device can be configured in CA. If a D2D capable wireless device is capable of being served by one or more additional serving cells than the current CA configuration then the network device 15 may configures the D2D capable wireless device with one or more new serving cells (e.g. SCell/PCell/PSCell, etc.) on a new carrier frequency or frequencies (which are not currently configured) and move the D2D capable wireless device to the new serving cell(s).

The network device 15 may reconfigure one or more currently serving cells on the existing carrier frequencies but with different configuration (e.g. larger bandwidth). This will allow the D2D capable wireless devices to use more resources for transmission and/or reception of D2D signals.

The network device 15 may de-configure the already configured one or more serving cells and move the wireless devices in that cell to other configured cells.

In another example, if the D2D operation pattern shows that the D2D capable wireless devices currently perform D2D operation in a certain area only, then the network device 15 may configure a new serving cell designated for D2D operation in that area only, or it may distribute the D2D wireless devices among the sidelinks of the configured cells in that area to achieve load balancing.

Reference is now made to FIG. 5 illustrating methods for balancing D2D traffic in a communications network 10*a*-10*g* as performed by a network device 15 according to further embodiments. Parallel references are continued to the communications networks 10*a*-10*g* as schematically illustrated in FIGS. 1*a*-1*g*.

There may be different ways to adapt the D2D traffic as in step S108. Different embodiments relating thereto will now be described in turn.

For example, the adaptation may involve configuration. Different embodiments relating thereto will now be described in turn. According to an embodiment the adapting of the D2D traffic involves the network device 15 to, in a step S108*a*, configure at least one D2D capable wireless device in the first set of D2D capable wireless devices with at least one new serving cell and configuring D2D traffic of the at least one D2D capable wireless device on the at least one new serving cell. Further, according to an embodiment the adapting of the D2D traffic involves the network device 15 to in a step S108*b* configure D2D traffic on at least one sidelink on the carrier of the at least one new serving cell. There are different examples of such at least one new serving cell. The at least one new serving cell may be a PCell, an SCell, or a PSCell of the at least one D2D capable wireless device in the first set. In case the at least one wireless device is already configured with a first SCell, the configuring may comprise configuring D2D traffic of the at least one wireless device with a second SCell.

For example, the adaptation may involve de-configuration. Different embodiments relating thereto will now be described in turn. According to an embodiment the adapting of the D2D traffic involves the network device 15 to, in a step S108*c*, de-configuring at least one D2D capable wireless device in the first set of D2D capable wireless devices with at least one existing serving cell and de-configuring D2D traffic of the at least one D2D capable wireless device on the at least one existing serving cell. There are different examples of such at least one existing serving cell. The at least one existing serving cell may be a PCell, an SCell, or a PSCell, of the at least one D2D capable wireless device in the first set.

For example, the adaptation may involve swapping. Different embodiments relating thereto will now be described in turn. According to an embodiment the adapting of the D2D traffic involves the network device 15 to, in a step S108*d*, swap D2D traffic of at least one D2D capable wireless device in the first set of D2D capable wireless devices from a primary serving cell to a secondary serving cell. Alternatively, according to an embodiment the adapting of the D2D traffic involves the network device 15 to, in a step S108*e*, swap D2D traffic of at least one D2D capable wireless device in the first set of D2D capable wireless devices from a secondary serving cell to a primary serving cell. Additionally, or alternatively, according to an embodiment the adapting of the D2D traffic involves the network device 15 to, in a step S108*f*, distribute D2D traffic of at least one D2D capable wireless device in the first set of D2D capable wireless devices across sidelinks on carriers of existing serving cells said at least one wireless device.

For example, the adaptation may involve activation. According to an embodiment the adapting of the D2D traffic involves the network device 15 to, in a step S108*g*, activate at least one cell for serving at least one D2D capable wireless device in the first set of D2D capable wireless devices.

For example, the adaptation may involve deactivation. According to an embodiment the adapting of the D2D traffic involves the network device 15 to, in a step S108*h*, deactivate at least one cell from serving at least one D2D capable wireless device in the first set of D2D capable wireless devices.

Both WAN traffic and/or D2D traffic can vary over time. But there is currently no adaptive mechanism to maintain adequate distribution of resources between WAN and D2D operation in a cell when the traffic changes over time. There may be different ways to balance the D2D traffic also based on WAN traffic information. Different embodiments relating thereto will now be described in turn. These embodiments provide efficient ways of distributing resources between WAN operation and D2D operation in a cell.

Particularly, according to an embodiment the wireless device 15 is configured to, in a step S104a, acquire WAN traffic information of the first set of D2D capable wireless devices. According to an embodiment the adapting of the D2D traffic then involves the network device 15 to, in a step S108j, further adapt the D2D traffic within the communications network 10a-10g between the first cell on the first carrier and the second cell on the second carrier in the communications network 10a-10g based on the WAN traffic information acquired in step S104a.

Particularly, according to an embodiment the wireless device 15 is configured to, in a step S104b, acquire WAN traffic information of a second set of wireless devices not capable of D2D. According to an embodiment the adapting of the D2D traffic then involves the network device 15 to, in a step S108k, further adapt D2D traffic within the communications network 10a-10g between the first cell on the first carrier and the second cell on the second carrier in the communications network 10a-10g based on the WAN traffic information acquired in step S104b.

There may be different ways to provide the network device 15. Different embodiments relating thereto will now be described in turn. As noted above, the network device 15 may be part of a radio network node 11a. As also noted above, alternatively, the network device 15 is part of a D2D capable wireless device 12b. Any of the above disclosed embodiments apply regardless if the network device 15 is part of a radio network node 11a or a D2D capable wireless device 12b.

In case the network device 15 is part of the D2D capable wireless device 12b the network device 15 may be configured to, in an optional step S106a, transmit capability information to a network node 11a, 11b or to another D2D capable wireless device 12a. This capability information indicates that the D2D capable wireless device 12b (of which the network device 15 is part) is capable of adapting D2D traffic between at least the first cell on the first carrier and the second cell on the second carrier. The capability information may further indicate to a network node 11a that the D2D capable wireless device 12b (of which the network device 15 is part) is capable of adapting D2D traffic between at least the first cell on the first carrier and the second cell, provided it is configured with a certain type, or types, of CA. Examples of CA types are intra-band contiguous CA, intra-band non-contiguous CA, inter-band CA or any combination thereof. The D2D capable wireless device 12b may transmit the capability information to the network node 11a autonomously, or proactively, or in response to receiving a request from the network node 11a. The network node 11a may use the received capability information to decide whether to adapt D2D traffic between at least the first cell on the first carrier and the second cell by itself (i.e. if a network device 15 is part of the network node 11a) or allow the D2D capable wireless device 12b (i.e., if a network device 15 is part of the wireless device 12b) to perform such adaptation. The network node 11a may also store the received capability information for using it at a future time and/or forward it to another network node 11b.

In case the network device 15 is part of the D2D capable wireless device 12b the network device 15 may be configured to, in an optional step S106b, receive, prior to performing the adapting (as in step S108), information that the D2D capable wireless device 12b (of which the network device 15 is part) is allowed to perform the adapting (as in step S108). In some embodiment the D2D capable wireless device 12b may only perform the adaptation if and only if the D2D capable wireless device 12b is explicitly permitted by the network node 11a based on received information. If no such information is received then the D2D capable wireless device 12b may not perform the adaptation. In another exemplary embodiment the D2D capable wireless device 12b may be explicitly informed regarding whether the D2D capable wireless device 12b should or should not perform the adaptation. In another exemplary embodiment the D2D capable wireless device 12b may be explicitly informed about the time duration (e.g. 5 seconds, infinite time, until end of session, etc.) over which the D2D capable wireless device 12b should, or is allowed to, perform the adaptation. The information to allow the adaptation may be received from a network node 11a (e.g. serving network node). The information may comprise an indicator or a message permitting the D2D capable wireless device 12b to perform the adaptation. The network node 11a may transmit the information for example in case the network node 11a does not intend to adapt D2D traffic between at least the first cell on the first carrier and the second cell on the second carrier, and thus allow the D2D capable wireless device 12b to do so. The network node 11a may also transmit the information for example in case the network node is not capable of adapting D2D traffic between at least the first cell on the first carrier and the second cell on the second carrier, and thus allow the D2D capable wireless device 12b (of which the network device 15 is part) to do so. The network node 11a may also transmit the information for example in case the network node 11a is capable of adapting D2D traffic between at least the first cell on the first carrier and the second cell on the second carrier, but currently does not have enough resources (e.g. processors, memory, etc.) to perform such adaptation.

Particular embodiments of load balancing procedures incorporating at least some of the above disclosed embodiments will now be presented in turn.

A method in a network device 15 for load balancing by adapting D2D operation on existing cells will now be disclosed.

In this exemplary scheme the network device 15 may decide to distribute the load of the D2D capable wireless devices across existing serving cells of the wireless devices to achieve load balancing. The wireless devices are assumed to be capable of CA and are configured with a PCell and at least one SCell or PSCell. A mechanism of the load balancing by redistributing load across the serving cells of the wireless devices will now be explained by means of illustrative examples.

Figure 1B:
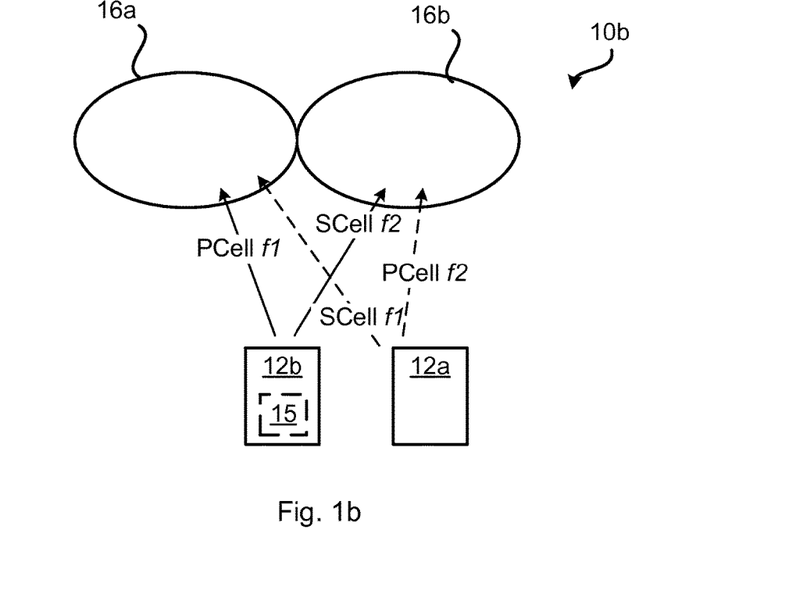
FIGS. 1*b*-1*g* are schematic diagrams illustrating part of the communication network of FIG. 1*a* according to embodiments.

In a typical scenario, if there are X number of CA capable wireless devices 12b in a first set and Y number of CA capable wireless devices 12a in a second set, the wireless devices 12a, 12b may be distributed on different serving cells (i.e., have different PCells) as shown in the communications network 10b as in FIG. 1b. FIG. 1b schematically illustrates that X number of wireless devices 12b is configured for cellular operation on PCell on f1 and SCell on f2, while Y number of wireless devices 12a is configured for cellular operation on PCell on f2 and SCell on f1.

Figures 1C, 1D, 1E:
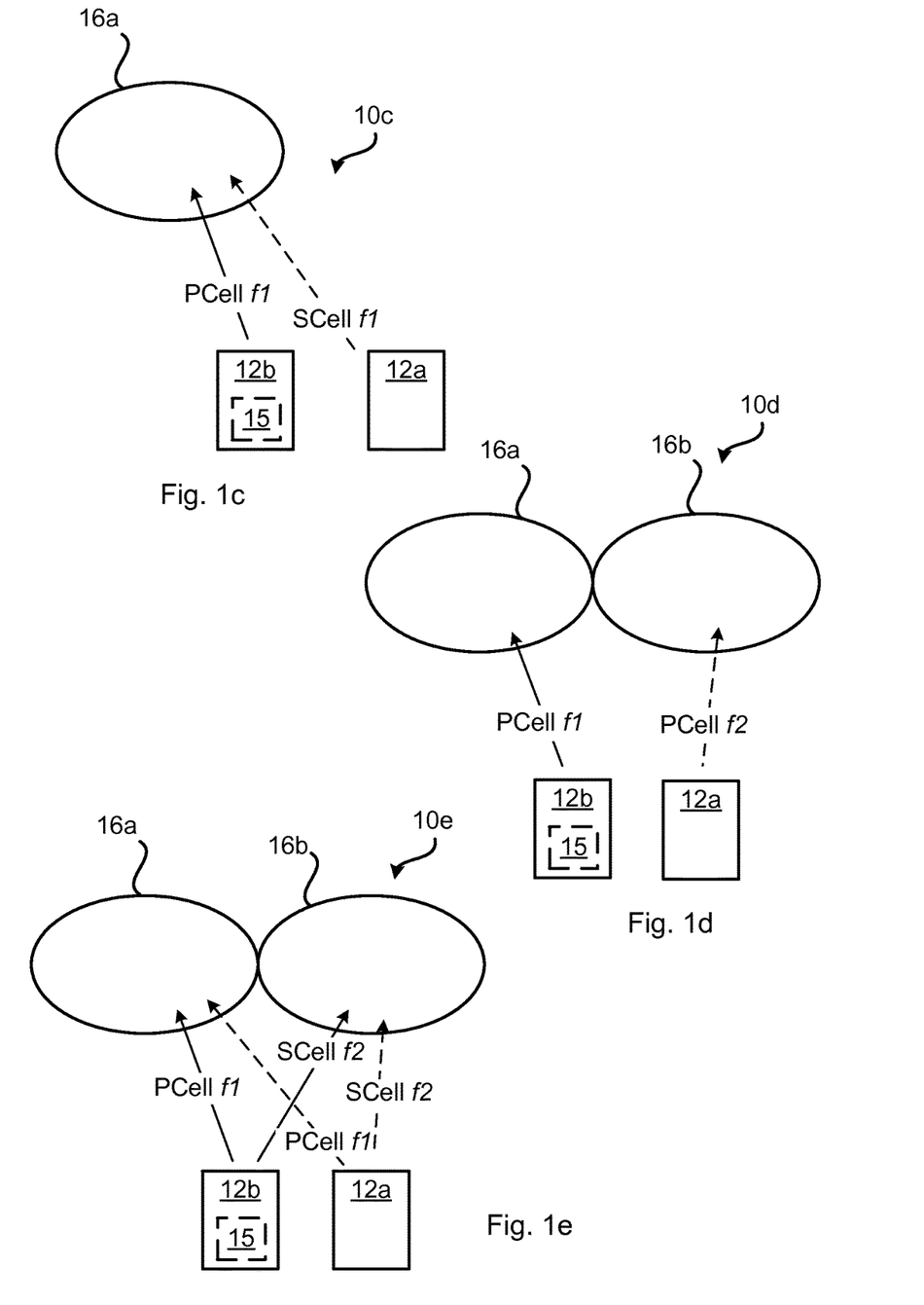

In the above scenario, if the received information at the network device 15 indicates that the X and Y number of wireless devices 12a, 12b are e.g., both CA capable and D2D capable, the network node takes this information into account and distribute the wireless devices 12a, 12b differently, as in any of above steps S108-S108k, depending on the purpose of the load balancing. On example is schematically illustrated in FIG. 1c, showing that X number of wireless devices 12b which are both CA and D2D capable are configured for D2D operation on a sidelink on the carrier of the PCell (i.e. on f1) and, Y number of wireless devices 12a are configured for D2D operation on a sidelink on the carrier of SCell (i.e. on f1). That is, the load of wireless devices may be distributed across sidelinks on different carriers e.g. between carrier f1 and carrier f2. The carriers f1 and f2 may be of a PCell and a SCell, respectively, for one group of wireless devices and of an SCell and a PCell, respectively, for a another group of wireless devices.

One advantage of the above mechanism (as illustrated in FIG. 1c) of distributing the D2D capable wireless devices on the sidelink of the same carrier frequency is that this enables all D2D capable wireless devices to communicate with each other.

If D2D traffic/operation pattern information acquired and/or D2D traffic load acquired at the network device 15 (as in any of steps S104-S104b) shows a certain pattern and/or load is above a threshold of the D2D capable wireless devices involved communication, then the network device 15 may use this information to adapt its way of performing load balancing. For example this load balancing procedure may be triggered only if the D2D traffic (e.g. total number of D2D wireless devices) is above a threshold. Further metrics and or parameters used as thresholds have been disclosed above. The network device 15 may then further assess the D2D traffic pattern to decide which specific procedure is to be applied to achieve the load balancing. For instance, if the D2D operation pattern shows that there are two groups of UEs (say groups X and Y) which are interested in D2D communication with other D2D capable wireless devices within its own group, then the network device 15 may perform the adaptation of D2D traffic (as in any of steps S108-S108k) such that: X number of D2D capable wireless devices are configured for D2D operation on a sidelink on the carrier of the PCell on e.g. f1, and Y number of D2D capable wireless devices are configured for D2D operation on a sidelink on the carrier of the PCell on e.g. f2, as shown in FIG. 1d.

One advantage of the above mechanism (as illustrated in FIG. 1d) is that it enables D2D capable wireless devices to communicate with each other within at least their own group while this distributes the D2D load on sidelinks of different carriers. Although the idea is exemplified for two groups of wireless devices, the skilled person understands how the same principles can be generalized for any number of groups, say K number of groups.

Figure 1F:
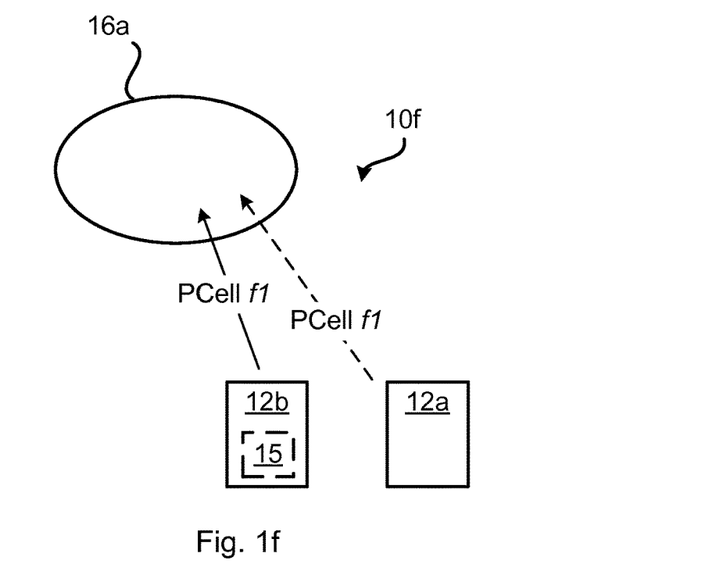

Yet another way of performing the load balancing when the CA capable wireless devices are configured for cellular operation with the same PCells is schematically illustrated in FIG. 1e. This is another typical scenario; it is assumed that X number of CA capable wireless devices 12b is configured for cellular operation on a PCell on f1 and an SCell on f2, and Y number of CA capable wireless devices 12a is configured for cellular operation on a PCell on f1 and an SCell on f2. In this case, if the received information at the network device 15 indicates that the X and the Y number of wireless devices 12a, 12b are, e.g., both CA capable and D2D capable, the network device 15 may perform the load balancing as in any of steps S108-S108k by distributing the wireless devices 12a, 12b in a way as shown in FIG. 1f. In other words: the X number of wireless devices 12b which are both CA and D2D capable are configured for D2D operation on a sidelink on the carrier of the PCell (i.e., on f1), and the Y number of wireless devices 12a are additionally configured for D2D operation on a sidelink of the carrier of the PCell (i.e. on f1).

One advantage of the above mechanism (as illustrated in FIG. 1f) of distributing the D2D capable wireless devices on the same carrier frequency is that this enables all D2D capable wireless devices to communicate with each other.

If the D2D traffic/operation pattern information acquired by the network device 15 (as in any of steps S104-S104b) indicates a certain communications pattern of the communicating D2D capable wireless devices, then the network device 15 may use this information to adapt its way of performing load balancing based on this information. For instance, if the D2D operation pattern shows that there are two groups of wireless devices (say, groups X and Y) which are interested in D2D communication with other D2D capable wireless devices within its own group, the network device 15 may perform the load balancing as in any of steps S108-S108k by configuring: the X number of D2D capable wireless devices 12b for D2D operation on a sidelink of the carrier of the PCell on, e.g., f1, and the Y number of D2D capable wireless devices 12a for D2D operation on a sidelink of the carrier of the SCell on, e.g. f2. This is schematically illustrated in FIG. 1g.

Figure 1G:
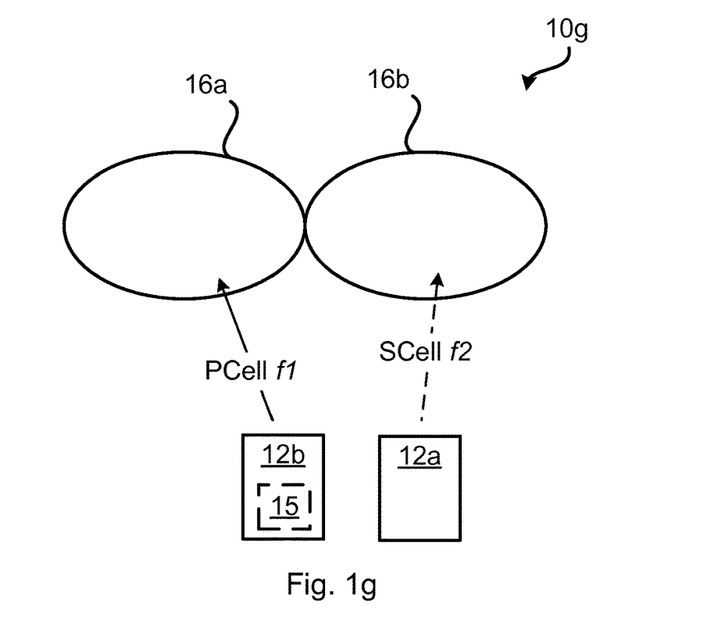

One advantage of the above mechanism (as illustrated in FIG. 1g) is that it enables D2D capable wireless devices 12a, 12b to communicate with each other within at least their own group whilst distributing the D2D traffic load on different carriers. Although the idea is exemplified for two groups of wireless devices, the skilled person understands how the same principles can be generalized for any number of groups, say K number of groups.

A method in a network device 15 for load balancing by configuring additional cell(s) for D2D operation will now be disclosed.

There may be one or a plurality of type-2 (i.e., D2D capable) wireless devices 12a, 12b managed by the network device 15. Additional cells (e.g., SCells, PCells, PSCells) may be configured and de-configured by the network device 15 on need basis. The method presented in this embodiment is applicable to a network node 11a, 11b that serves wireless devices 12a, 12b of various types. Non-limiting examples of such various types of wireless devices are cellular wireless devices and D2D capable wireless devices.

In a first example, the network device 15 receives information that D2D capable wireless devices 12a, 12b exist in the cell that is served by a network node 11a, 11b (as in step S102). A D2D capable wireless device may, for example, signal its D2D capability to the network device 15, or the network device 15 can be informed by signaling from other nodes, such as network nodes 11a, 11b, a node in the core network 13, etc. In this case the network device 15 may adapt its load balancing, as in any of steps S108-S108k, by distributing the load of the D2D operation between sidelinks on carriers of the PCell and SCell of different carrier frequencies, or between the PCell of a first carrier frequency and the PCell of a second carrier frequency. One advantage of distributing the wireless devices 12a, 12b in this way is that the D2D capable wireless devices 12a, 12b are distributed among the cell and the cells becomes less subject to load imbalances due to the number of D2D capable wireless devices 12a, 12b in the communications network 10a-10g.

A method in a network device 15 for load balancing by adapting D2D operation on existing cells and configuring new serving cells will now be disclosed.

The network device 15 may perform the load balancing by combining at least two of the above disclosed mechanisms for load balancing. Such a combined load balancing mechanism may be applied when the D2D traffic load is very high (i.e., above a threshold) and there are a mixture of D2D capable wireless devices 12a, 12b currently configured in CA and D2D capable wireless devices 12a, 12b currently configured with single carrier.

For example, the network device 15 may adapt the D2D traffic as in step S108 by swapping the D2D operation on sidelinks on carriers of the existing serving cells (e.g. between PCell and SCell(s)) for one set of D2D capable wireless devices (as in step S108d and/or step S108e) and configuring one or more new serving cells (e.g. SCells) and configuring D2D operation on sidelinks of the new configured serving cells for another set of D2D capable wireless devices (as in step S108 and/or S108b).

As an example, the network device 15 may perform swapping of the D2D operation based on the above disclosed method in a network device 15 for load balancing by adapting D2D operation on existing cells for D2D capable wireless devices which are already configured with at least one SCell.

The network device 15 may configure additional serving cell for the D2D capable wireless devices which are currently operating with a single carrier (i.e. with a PCell) and loading high D2D traffic on a particular carrier, e.g. f1. Therefore, the network device may configure such D2D capable wireless devices with an SCell on another carrier (e.g. f2 or f3) and configure the D2D operation on a sidelink of the new serving cell (e.g. on f2 or f3). In this way the D2D traffic on f1 can be reduced, or even minimized.

In summary, according to at least some of the embodiments presented herein there has been disclosed methods for balancing D2D traffic in a communications network 10a-10g as performed by a network device 15 comprising the following:

Obtaining a first set of information about whether D2D capable wireless devices are present, i.e. if at least one D2D capable wireless device 12a, 12b is configured in a cell served by a network node 11a, 11b in the communications network 10a-10g.

Obtaining a second set of information about D2D traffic information (e.g., D2D traffic load, D2D traffic activity, and/or level of D2D traffic activity) of the D2D capable wireless devices in the cell, and/or a third set of information by identifying a D2D operation pattern between the D2D capable wireless devices (e.g. a group of D2D capable wireless devices communicating with each other) in the cell.

Based on the obtained first set of information in combination with at least one of the second and third sets of information (e.g. if D2D load is above a threshold), balancing the D2D traffic in the cell by:
configuring or de-configuring one or more D2D capable wireless devices with one or more new serving cells (e.g., SCells, PSCell etc) and configuring D2D operation on the new configured serving cell(s),
swapping the D2D operation of at least one D2D capable wireless device from its primary serving cell to a secondary serving cell, or vice versa (e.g., from PCell to SCell or vice versa), and/or
activating at least one cell for serving at least one D2D capable wireless device or deactivating at least one cell from serving at least one D2D capable wireless device.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, the methods for balancing D2D traffic in a communications network 10a-10g is be applicable to any number of SCells. For example, the embodiments presented hereinafter are applicable in particular when D2D communication takes place by wireless devices which are at least capable of CA, i.e. can be configured to operate with Pa Cell and one or more SCells. However, the embodiments also apply when the D2D capable wireless device is CA capable but is currently configured with single carrier operation. The same principle is also applicable for the D2D operation in other CA related operations. An example of such operation is Dual Connectivity. In this case, the D2D wireless devices may be configured on one or more PSCell, PCell, SCell and in which case the embodiments as disclosed hereinafter also apply.

The invention claimed is:

1. A method for balancing device-to-device (D2D) traffic in a communications network, the method being performed by a network device in the communications network, the method comprising:
   acquiring information indicating that a first set of D2D capable wireless devices is present in the communications network;
   acquiring D2D traffic information of the first set of D2D capable wireless devices; and
   adapting D2D traffic within the communications network, between a first cell on a first carrier and a second cell on a second carrier in the communications network, based on the D2D traffic information, thereby balancing D2D traffic in the communications network,
   wherein how to adapt the D2D traffic is based on an outcome of a comparison of the D2D traffic information to a threshold, and
   wherein the threshold is based on at least one of:
      number of wireless devices in the first set,
      number of other wireless devices in the cell, and
      fraction of resources configured for D2D operation on sidelinks of each of the first carrier and the second carrier.

2. The method according to claim 1, wherein at least one of the first carrier and the second carrier is configured for carrier aggregation.

3. The method according to claim 1, wherein at least one of the first cell and the second cell is a primary cell (PCell) of the first set of D2D capable wireless devices.

4. The method according to claim 1, wherein at least one of the first cell and the second cell is a secondary cell (SCell) of the first set of D2D capable wireless devices.

5. The method according to claim 1, wherein said adapting D2D traffic comprises:
   configuring at least one D2D capable wireless device in the first set of D2D capable wireless devices with at least one new serving cell and configuring D2D traffic of the at least one D2D capable wireless device on the at least one new serving cell.

6. The method according to claim 5, wherein said adapting D2D traffic comprises:
   configuring D2D traffic on at least one sidelink on the carrier of the at least one new serving cell.

7. The method according to claim 5, wherein the at least one new serving cell is a primary cell (PCell) a secondary cell (SCell) or a primary secondary cell (PSCell) of the at least one D2D capable wireless device in the first set.

8. The method according to claim 7, wherein in case said at least one wireless device is already configured with a first SCell, the configuring comprises configuring D2D traffic of said at least one wireless device with a second SCell.

9. The method according to claim 1, wherein said adapting D2D traffic comprises:

de-configuring at least one D2D capable wireless device in the first set of D2D capable wireless devices with at least one existing serving cell and de-configuring D2D traffic of said at least one D2D capable wireless device on the at least one existing serving cell.

10. The method according to claim 9, wherein the at least one existing serving cell is a primary cell (PCell) a secondary cell (SCell) or a primary serving cell (PSCell) of the at least one D2D capable wireless device in the first set.

11. The method according to a claim 1, wherein said adapting D2D traffic comprises:
swapping D2D traffic of at least one D2D capable wireless device in the first set of D2D capable wireless devices from a primary serving cell to a secondary serving cell.

12. The method according to claim 1, wherein said adapting D2D traffic comprises:
swapping D2D traffic of at least one D2D capable wireless device in the first set of D2D capable wireless devices from a secondary serving cell to a primary serving cell.

13. The method according to claim 1, wherein said adapting D2D traffic comprises:
distributing D2D traffic of at least one D2D capable wireless device in the first set of D2D capable wireless devices across sidelinks on carriers of existing serving cells said at least one wireless device.

14. The method according to claim 1, wherein said adapting D2D traffic comprises:
activating at least one cell for serving at least one D2D capable wireless device in the first set of D2D capable wireless devices.

15. The method according to claim 1, wherein said adapting D2D traffic comprises:
deactivating at least one cell from serving at least one D2D capable wireless device in the first set of D2D capable wireless devices.

16. The method according to claim 1, wherein the D2D traffic information represent at least one of traffic load, traffic activity, and traffic pattern of the D2D traffic in at least one of the first cell and the second cell.

17. The method according to claim 1, wherein the threshold is further based on at least one of:
mean or aggregated bit rate or throughput per wireless device in the cell,
total transmit power of wireless devices on at least one of the first carrier and the second carrier,
total number of used physical channels or resource blocks on at least one of the first carrier and the second carrier in a subframe or frame, and
fraction of used physical channels or resource blocks on at least one of the first carrier and the second carrier in a subframe or frame.

18. The method according to claim 1, wherein the threshold is further based on at least one of: location of wireless devices in the cell, type of generated traffic by wireless devices in the cell, and grouping of wireless devices in at least one of the first cell and the second cell.

19. The method according to claim 1, wherein the network device is part of a radio network node.

20. The method according to claim 1, wherein the network device is part of a D2D capable wireless device.

21. The method according to claim 20, further comprising:
transmitting capability information to a network node or to another D2D capable wireless device, said information indicating that the D2D capable wireless device is capable of adapting D2D traffic between at least the first cell on the first carrier and the second cell on the second carrier.

22. The method according to claim 20, further comprising:
receiving, prior to performing said adapting, information that the D2D capable wireless device is allowed to perform said adapting.

23. The method according to claim 1, wherein:
the D2D capable wireless devices are proximity-service (ProSe) capable wireless devices; and
the D2D traffic is at least one of ProSe direct communication and ProSe direct discovery.

24. The method according to claim 1, further comprising:
acquiring wide area network (WAN) traffic information of the first set of D2D capable wireless devices; and
further adapting D2D traffic within the communications network, between the first cell on the first carrier and the second cell on the second carrier in the communications network, based on the acquired WAN traffic information.

25. The method according to claim 1, further comprising:
acquiring wide area network (WAN) traffic information of a second set of wireless devices not capable of D2D;
further adapting D2D traffic within the communications network, between the first cell on the first carrier and the second cell on the second carrier in the communications network, based on the acquired WAN traffic information.

26. The method according to claim 24, wherein said WAN traffic information indicates at least one of:
number of wireless devices in the first set,
number of wireless devices in the second set,
mean or aggregated bit rate or throughput of the wireless devices in the second set,
mean or aggregated bit rate or throughput of the wireless devices in the first set,
amount of buffered data for the wireless devices in the first set, and
amount of buffered data for the wireless devices in the second set.

27. A network device for balancing device-to-device (D2D) traffic in a communications network, the network device comprising a processing unit, the processing unit being configured to cause the network device to:
acquire information indicating that a first set of D2D capable wireless devices is present in the communications network;
acquire D2D traffic information of the first set of D2D capable wireless devices; and
adapt D2D traffic within the communications network, between a first cell on a first carrier and a second cell on a second carrier in the communications network, based on the D2D traffic information, thereby balancing D2D traffic in the communications network,
wherein how to adapt the D2D traffic is based on an outcome of a comparison of the D2D traffic information to a threshold, and
wherein the threshold is based on at least one of:
number of wireless devices in the first set,
number of other wireless devices in the cell, and
fraction of resources configured for D2D operation on sidelinks of each of the first carrier and the second carrier.

28. A nontransitory computer readable storage medium comprising a computer program for balancing device-to-device (D2D) traffic in a communications network, the computer program comprising computer code which, when run on a processing unit of a network device, causes the network device to:
- acquire information indicating that a first set of D2D capable wireless devices is present in the communications network;
- acquire D2D traffic information of the first set of D2D capable wireless devices; and
- adapt D2D traffic within the communications network, between a first cell on a first carrier and a second cell on a second carrier in the communications network, based on the D2D traffic information, thereby balancing D2D traffic in the communications network,
- wherein how to adapt the D2D traffic is based on an outcome of a comparison of the D2D traffic information to a threshold, and
- wherein the threshold is based on at least one of:
  - number of wireless devices in the first set,
  - number of other wireless devices in the cell, and
  - fraction of resources configured for D2D operation on sidelinks of each of the first carrier and the second carrier.

* * * * *

UNITED STATES PATENT AND TRADEMARK OFFICE
CERTIFICATE OF CORRECTION

PATENT NO. : 10,051,517 B2
APPLICATION NO. : 14/427943
DATED : August 14, 2018
INVENTOR(S) : Thangarasa et al.

Page 1 of 2

It is certified that error appears in the above-identified patent and that said Letters Patent is hereby corrected as shown below:

On the Title Page

In Item (72), under "Inventors", in Column 1, Line 1, delete "Vallingby" and insert -- Vällingby --, therefor.

In Item (57), under "ABSTRACT", in Column 2, Line 15, delete "device perform" and insert -- device to perform --, therefor.

In the Specification

In Column 5, Line 56, delete "laptop embedded equipped (LEE)," and insert -- laptop embedded equipment (LEE), --, therefor.

In Column 7, Line 28, delete "sCellDeactivationTimer" and insert -- SCellDeactivationTimer --, therefor.

In Column 7, Line 41, delete "communications network boa" and insert -- communications network 10a --, therefor.

In Column 7, Line 58, delete "communications network boa." and insert -- communications network 10a. --, therefor.

In Column 8, Lines 47-48, delete "communications network boa." and insert -- communications network 10a. --, therefor.

In Column 9, Line 53, delete "further comprises" and insert -- further comprise --, therefor.

In Column 10, Lines 46-47, delete "communications networks boa-log" and insert -- communications networks 10a-10g --, therefor.

Signed and Sealed this
Fourth Day of December, 2018

Andrei Iancu
*Director of the United States Patent and Trademark Office*

CERTIFICATE OF CORRECTION (continued)
U.S. Pat. No. 10,051,517 B2

In Column 10, Lines 52-53, delete "communications network boa-log" and insert -- communications network 10a-10g --, therefor.

In Column 11, Line 13, delete "assumed operate" and insert -- assumed to operate --, therefor.

In Column 12, Line 18, delete "core network 14," and insert -- core network 13, --, therefor.

In Column 13, Line 27, delete "carrier ft" and insert -- carrier f1 --, therefor.

In Column 15, Lines 3-4, delete "wireless device 15" and insert -- wireless device 12a --, therefor.

In Column 15, Lines 13-14, delete "wireless device 15" and insert -- wireless device 12b --, therefor.

In Column 17, Line 9, delete "for a another" and insert -- for another --, therefor.

In Column 17, Line 25, delete "and or" and insert -- and/or --, therefor.

In Column 19, Lines 66-67, delete "is be applicable" and insert -- is applicable --, therefor.

In the Claims

In Column 20, Line 59, in Claim 7, delete "(PCell)" and insert -- (PCell), --, therefor.

In Column 21, Line 7, in Claim 10, delete "(PCell)" and insert -- (PCell), --, therefor.

In Column 21, Line 10, in Claim 11, delete "to a claim" and insert -- to claim --, therefor.